Dec. 12, 1967     I. C. WACLAWSKI ETAL     3,357,323
MACHINE FOR ASSEMBLING CASE PARTITIONING MEMBERS
Filed July 19, 1965     8 Sheets-Sheet 1

INVENTORS
IGNACE C. WACLAWSKI
ROBERT SPURR

BY McCormick, Paulding & Huber
ATTORNEYS

Dec. 12, 1967    I. C. WACLAWSKI ET AL    3,357,323
MACHINE FOR ASSEMBLING CASE PARTITIONING MEMBERS
Filed July 19, 1965    8 Sheets-Sheet 5

INVENTORS
IGNACE C. WACLAWSKI
ROBERT SPURR
BY McCormick, Paulding & Huber
ATTORNEYS

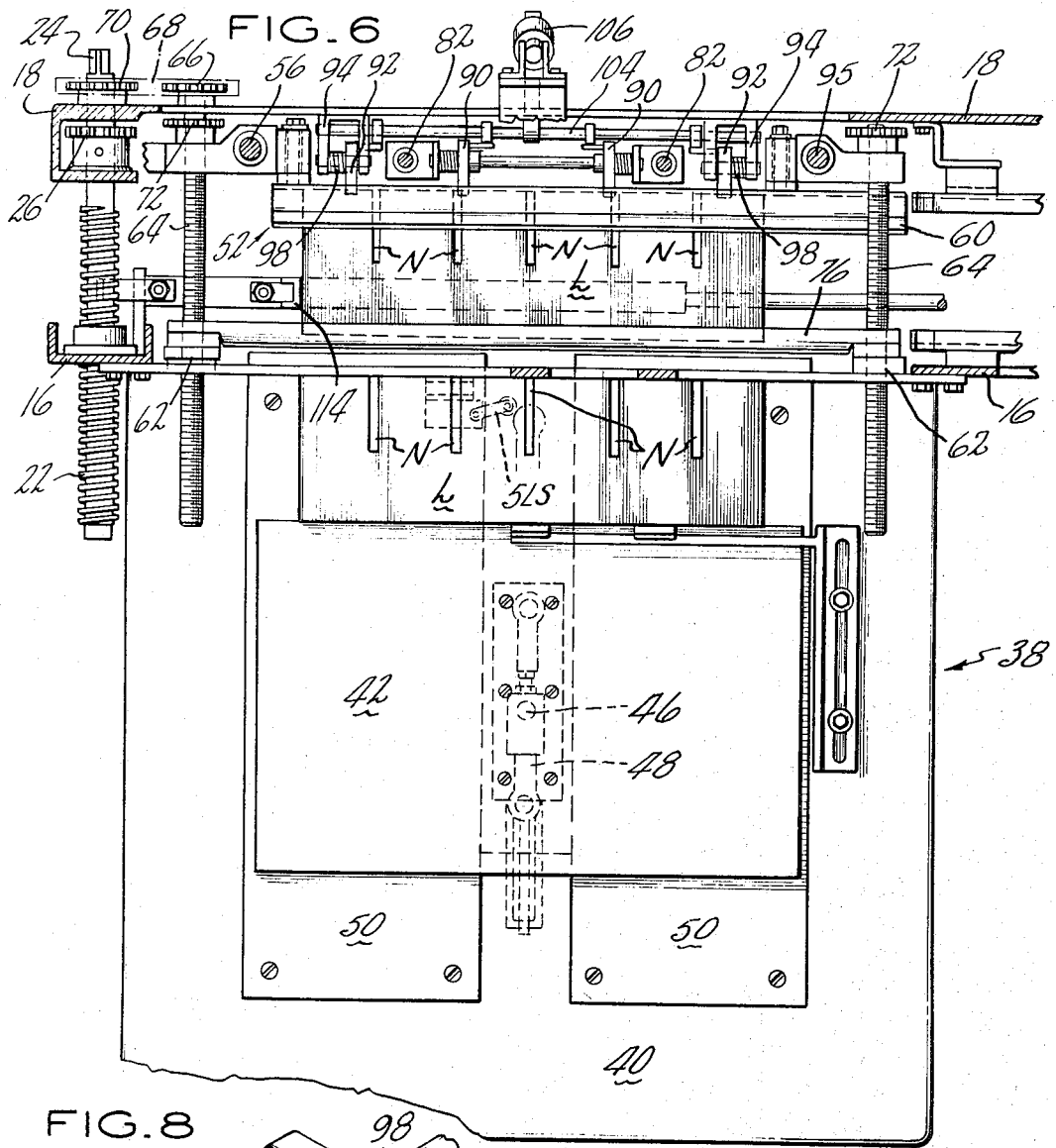

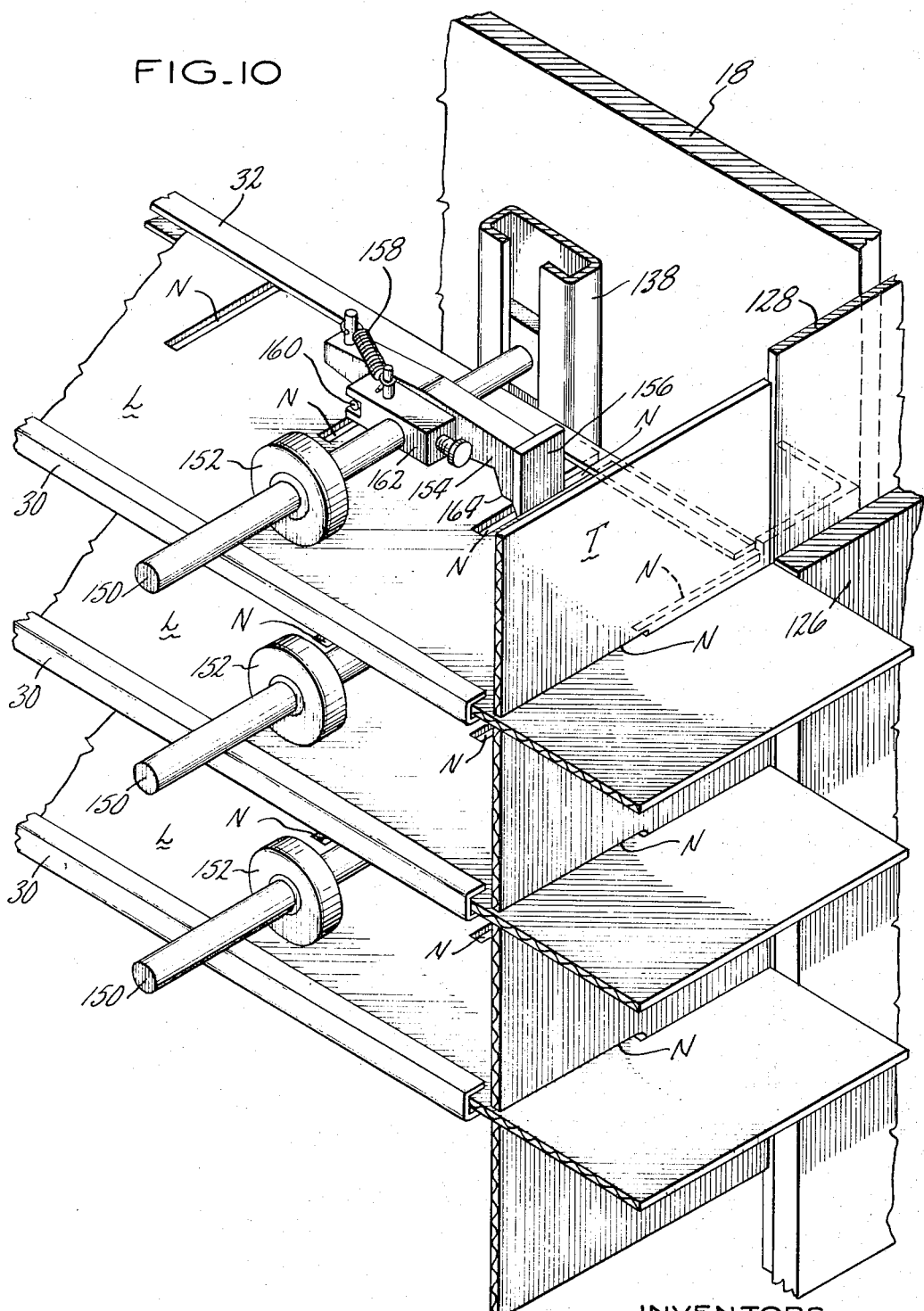

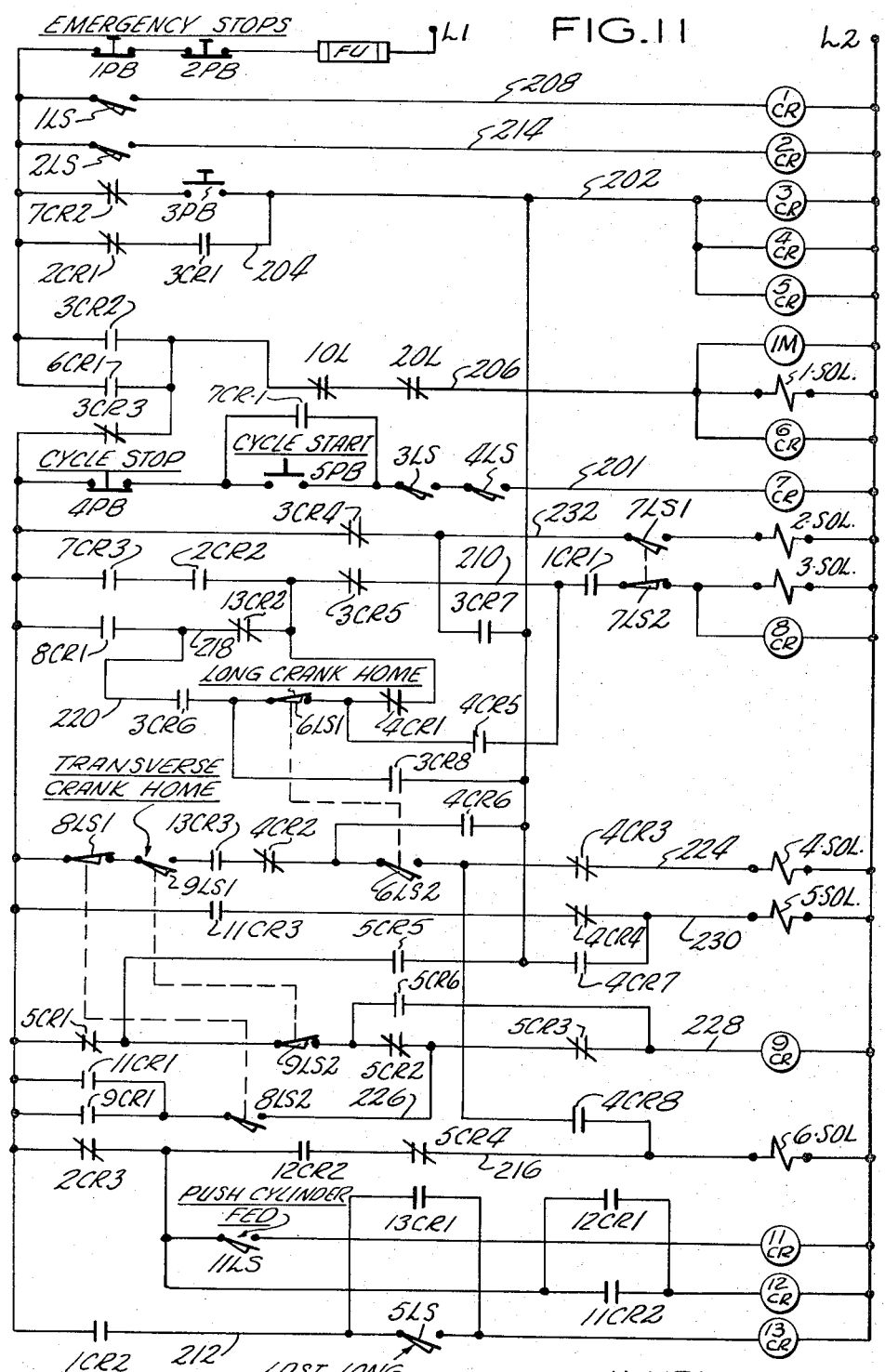

United States Patent Office 3,357,323
Patented Dec. 12, 1967

3,357,323
MACHINE FOR ASSEMBLING CASE
PARTITIONING MEMBERS
Ignace C. Waclawski, Wethersfield, and Robert Spurr,
West Hartford, Conn., assignors to Emhart Corporation, Bloomfield, Conn., a corporation of Connecticut
Filed July 19, 1965, Ser. No. 473,130
14 Claims. (Cl. 93—37)

This invention relates to a machine for assembling case partitioning members of the type which are to be nested in a case in two engaged sets, one set extending longitudinally and the other transversely of the case. The members in each set are provided with regularly spaced slashed notches along one edge (the mating edge), and the sets are connected by engaging the members thereof so the notches in one set bisect the notches in the members in the other set. Thus, the sets, when assembled and nested in a case, define compartments or cells to receive articles being packed. In making up a case for twenty-four articles, there will be three partition members in the longitudinally extending set, each of which is provided with five notches to receive five members making up the transverse set. When these two sets are assembled and placed in the case, they cooperate with the four vertical walls of the case to define the required twenty-four cells.

It is the general object of the present invention to provide a fully automatic machine which will assemble the case partitioning members in the aforementioned way and in a substantially foolproof manner so that the services of an operator are required only to maintain a supply of the partitioning members in suitable magazines forming a part of the machines.

It is a further object of the invention to provide such machine which can easily be adjusted and thus preset to handle partition members of different size and to handle partition members in different number for different size cases and for cases adapted to pack articles in different number.

As will be described in more detail hereinafter, the machine of the present invention includes two relatively adjustable frames each of which supports a magazine, one for the partitioning members which are to extend longitudinally and the other for the partitioning members which are to extend transversely. The two frames are relatively adjustable to accommodate partitioning members of different widths, and they cooperate to define guide means which accommodate longitudinal movement of the members of one set (for example, the longitudinal set) from one magazine to the other magazine.

It is a constructional feature of a machine provided in accordance with the present invention that the partitioning members forming the said one set are fed one at a time from the one magazine and then arranged in spaced apart parallel relationship. They are then pushed toward the said other magazine along the guide means to a position where a hitch feed takes over to advance them in step-by-step fashion. That is, the hitch feed is employed to bring the similar notches in the members of the longitudinally advancing set into registry adjacent the other magazine. The partitioning members from the other magazine, which are the members of the set to extend transversely, are then fed from the other magazine one at a time to engage in the notches of the one set to complete the assembly of the longitudinally and transversely extending sets.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 6 is a plan view of the magazine wherein the longitudinal partition members are provided, and this view includes a cross section through the machine frame at the end thereof where the said magazine is located;

FIG. 7 is an elevational view of the elevator mechanism associated with the magazine shown in FIG. 6;

FIG. 8 is an enlarged perspective view of the pawl mechanism associated with the elevator of FIG. 7;

FIG. 9 is a detail view of the actuator for the pawl mechanism;

FIG. 10 is an enlarged perspective view showing a detail of the hitch feed structure in the area where the transverse partitioning members are assembled with the longitudinally extending partitioning members; and FIG. 11 is a schematic diagram showing the electrical wiring for the machine, and this view will be used in connection with the description of the machine operation.

Figure 1:
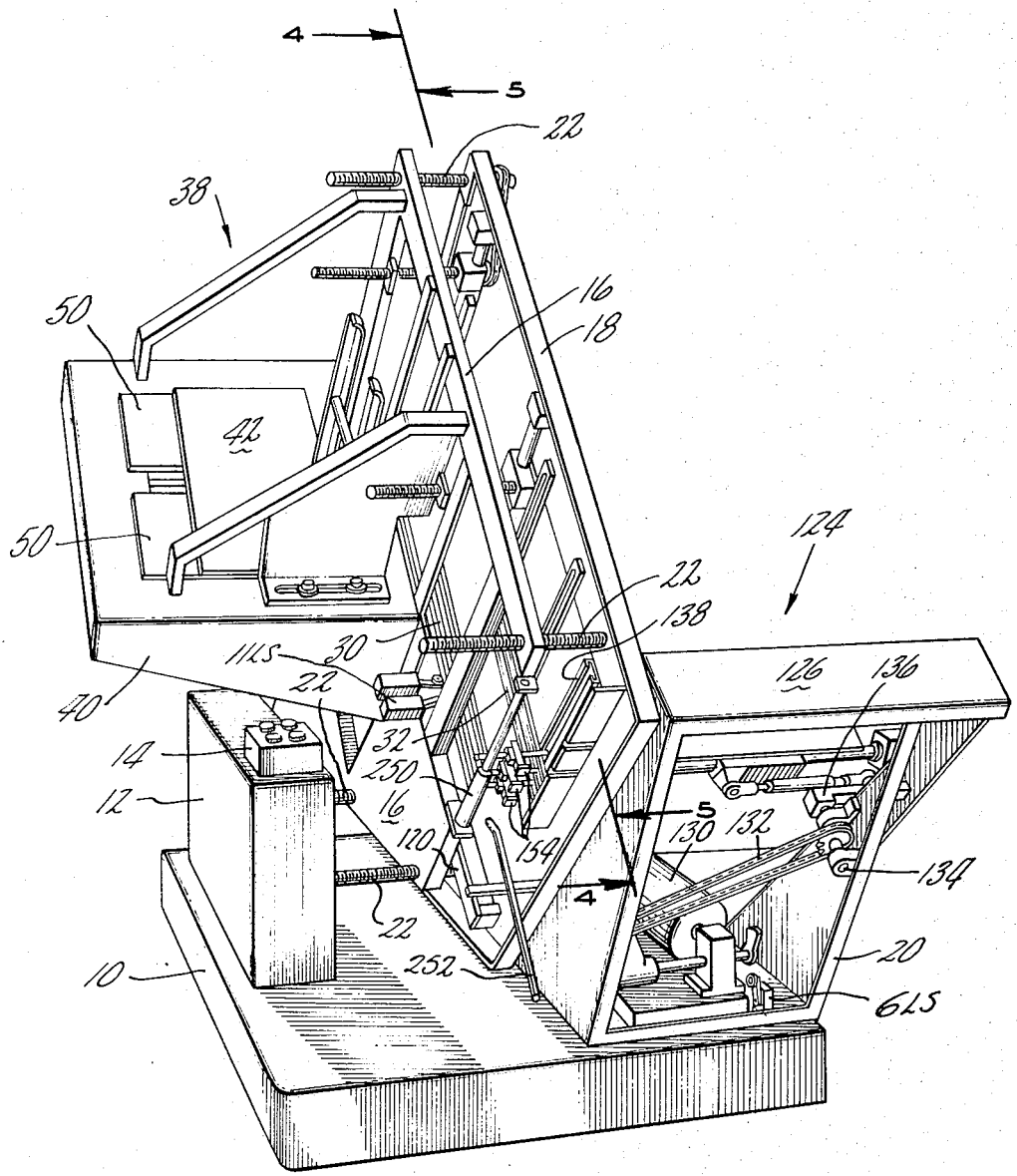
FIG. 1 is a perspective view of the machine of this invention taken generally from the end of the machine wherein the assembly of the partitioning members is completed.

As best seen in FIGS. 1–5, the machine is built upon a low rectangular floor base 10. The machine operator will generally stand at the side of the base 10 from which the machine is viewed in FIG. 2, and an operator's console 12 is provided on this side of the base so that the operator can easily reach a control box 14 on top of the console, the control box having the various push buttons which the operator will use in controlling automatic operation of the machine.

Rearwardly of the console 12, there is a first generally rectangular frame 16 which is supported by a second or rearward generally similar rectangular frame 18. The frame 18 is supported on the base 10 by being welded or otherwise secured to a pedestal 20 forming a part of a magazine which will be described hereinafter, and it will be noted that the frames 16 and 18 are disposed in parallel vertical planes.

The frame 16 is supported by the frame 18 on a series of peripherally spaced horizontally extending jack screws 22, 22. One of these jack screws is provided with a wrench head 24 (FIG. 6), and all of the jack screws 22, 22 are rotatably supported in the frame 18 and have sprockets 26, 26 pinned thereto to accommodate an endless chain 28. Each of the said jack screws is threaded into the frame 16 whereby upon rotating the jack screws in one and the opposite direction, the front frame 16 can be moved forwardly and rearwardly, respectively, relative to the frame 18. Obviously, when the jack screw 22 is rotated by means of its wrench head 24, the encircling endless chain 28 on the sprockets 26, 26 will rotate all jack screws at the same time and by the same amount.

The frames 16 and 18 cooperate to define guide means for accommodating longitudinal movement of one set of partitioning members when they are arranged in spaced apart parallel relationship with their mating edges facing rearwardly and with their spaced notches in general registry with each other, and the purpose of having the frame 16 adjustable relative to the frame 18 is to adapt the machine to accommodate partitioning members of different widths.

It will be noted in the various views of the drawings that the generally rectangular frames 16 and 18 are set at an angle. That is, one corner of the parallel frames is uppermost and the side edges of the frames making said corner extend downwardly therefrom at 45° angles. The guide means formed by the frames 16 and 18 also is inclined to extend downwardly at substantially 45° from the one end or left-hand end thereof as viewed in FIG. 2 to the other end or right-hand end thereof. This angular arrangement of the frames 16 and 18 is provided so that partitioning members stacked in a magazine associated with one frame will be disposed at a 90° angle or transversely to partitioning members stacked in a magazine associated with the other frame.

Figure 2:
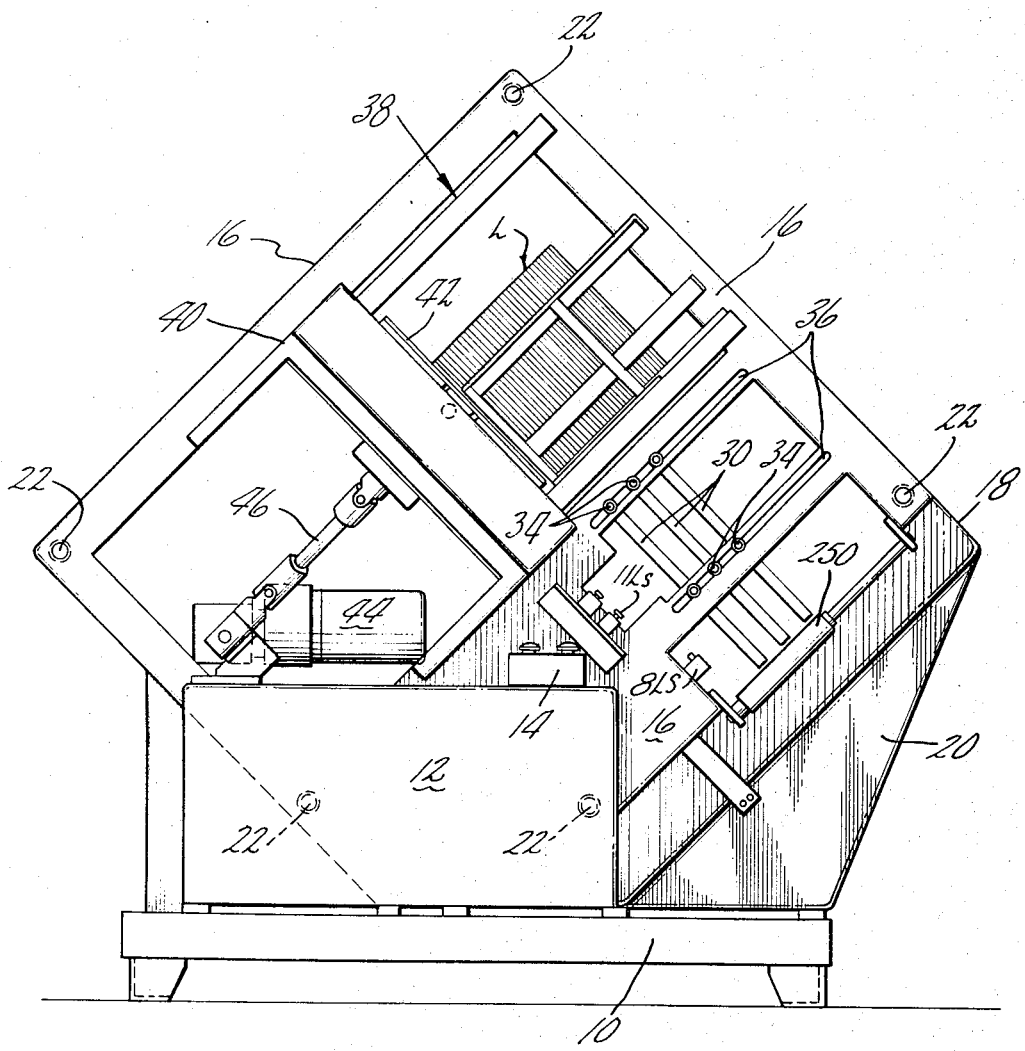
FIG. 2 is an elevational view from one side of the machine which may hereinafter be referred to as being the operator's side or front of the machine.
Figure 4:
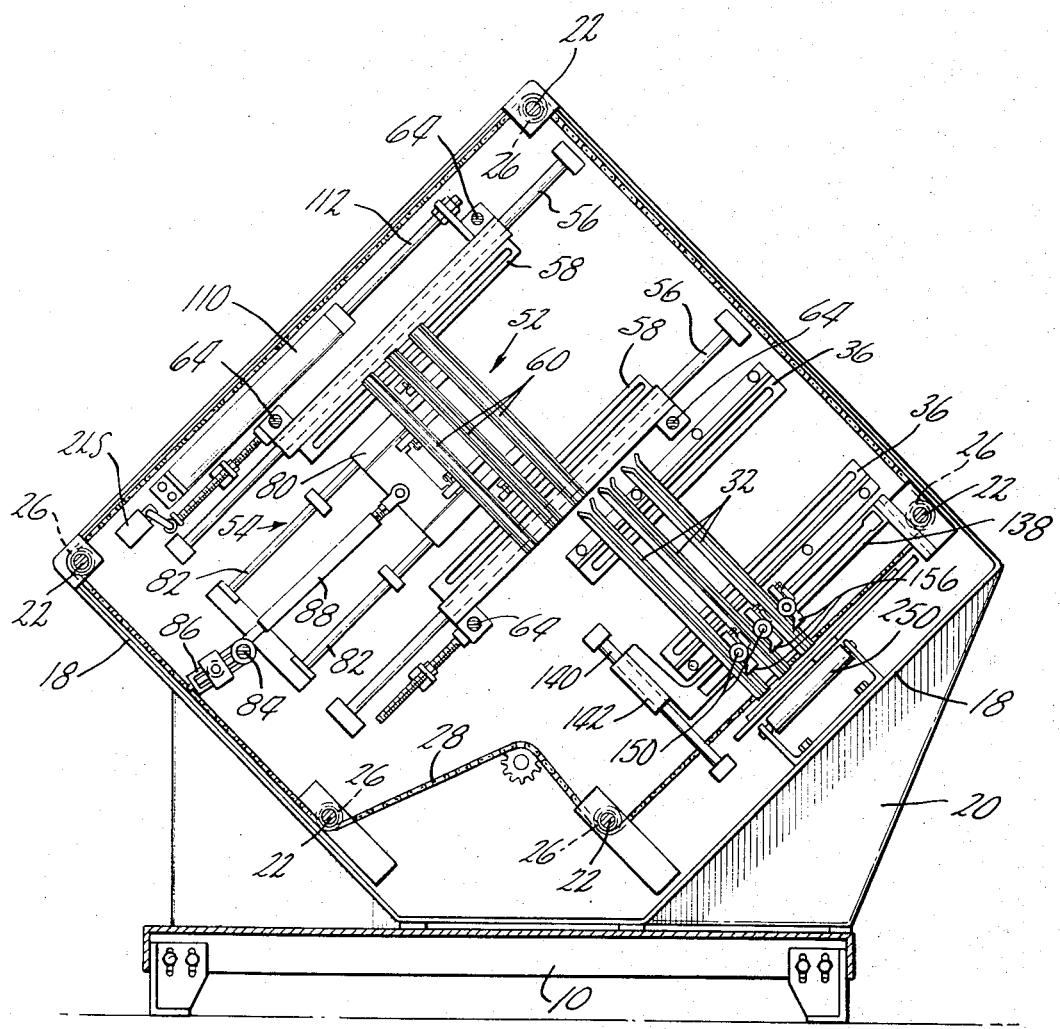
FIG. 4 is a rearwardly facing vertical sectional view of the machine taken generally as indicated by the line 4—4 of FIG. 1.
Figure 5:
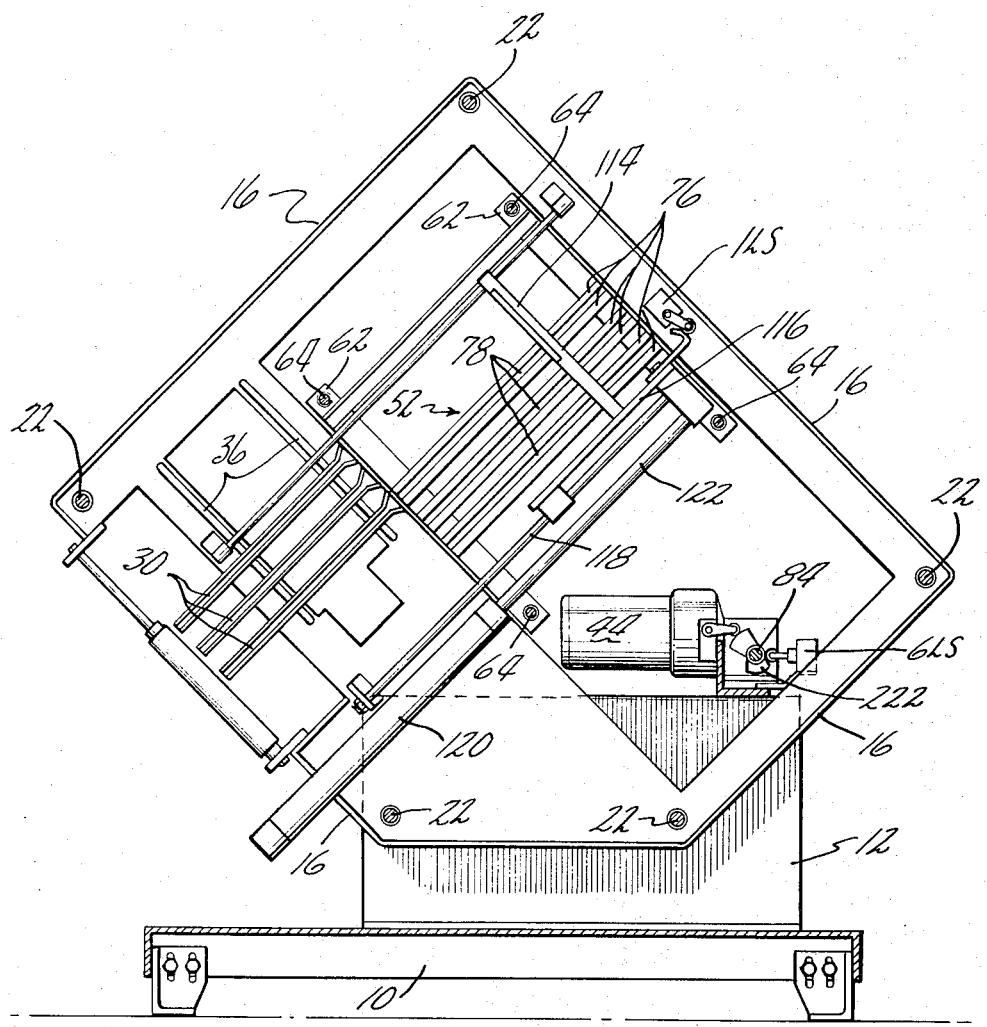
FIG. 5 is a forwardly facing vertical sectional view taken as indicated generally by the line 5—5 of FIG. 1.

The said guide means is formed by the frames 16 and 18 by securing a plurality of channel members 30, 30 to the frame 16 (FIGS. 1, 2 and 5) and by similarly securing channel members 32, 32 to the frame 18 (FIGS. 1 and 4). As shown, there are three channel members 30, 30 for the frame 16 and three channel members 32, 32 for the frame 18 so as to accommodate three partitioning members in one set which will be referred to hereinafter as the longitudinal set. This will be the desired arrangement in assembling partitioning members for a twenty-four article case, the longitudinal set being joined by a set of five transverse partitioning members. The channel members on the respective frames receive the opposite longitudinal edges of the partitioning members for the longitudinal set, and the longitudinal edge received in the channel members 32, 32 on the frame 18 should be the mating edge provided with the regularly spaced slashed notches. The channel members on each frame are secured by tightening bolts and nuts 34, 34 movable in slots 36 as seen in FIGS. 2, 4 and 5 so that the spacing between the channel members can be adjusted for different size partitions. Also, a different number of channel members can be used for the assembly of partitions for different cases.

At the said one or upper end of the guide means, there is a first magazine indicated generally by the reference number 38 (FIGS. 1 and 6) and this magazine provides storage and supply for a stack of partitioning members L, L (FIG. 6) which are to be used in making up one set, this being the longitudinal set which is to be moved down the aforedescribed guide channels. The magazine 38 is carried by the frame 16 and it includes a base 40 for supporting a stack of the partitioning members L, L. This magazine base 40 is adapted to accommodate and guide reciprocating movement of a feed plate 42 transversely of the frame 16 adjacent the upper end of the guide channels 30 and 32. This plate 42 when it is advanced toward the frames 16 and 18 from a retracted or "home" position will feed the lowermost partition member L out of the stack and into position between the frames 16 and 18. It will be noted with reference to FIG. 6 that the partition members are loaded in the magazine 38 so that their slashed notches N, N are directed toward the frame 18, and thus the partition members L, L are fed one at a time and mating edge first from the magazine 38.

The means for reciprocating the feed plate 42 includes a first motor 44 (FIGS. 2 and 5) which is adjustably mounted on top of the operator's console 12. This motor drives a universally connected shaft 46 (FIG. 2) which at its upper end operates a crank 48 (FIG. 6) which is connected to the plate 42 to reciprocate the same on the base 40 of the magazine 38. The base 40 is suitably slotted to accommodate the shaft and crank connections and it is provided with plates or guideways 50, 50 for the reciprocatory movement of the partition feeder plate 42.

The magazine feeder plate 42 moves the partitioning members L, L one at a time from the bottom of the stack in the magazine into a locating means which accumulates the required number of partitioning members (three in the example shown) and then positions them for entry into the said one or upper end of the guide channels 30, 30 and 32, 32 comprising the longitudinally extending guide means. This locating means includes a rack which is indicated generally by the reference number 52 and an elevator which is indicated generally at 54. The rack is best shown in FIGS. 4, 5 and 6, and the elevator is shown in FIGS. 4 and 7.

The said rack includes a pair of elongated guide rods 56, 56 which are mounted on the frame 18 in spaced apart relationship to extend at a right angle to the guide channels 32, 32 adjacent the one or upper end thereof. As shown in FIGS. 4 and 6, the guide rods 56, 56 are mounted by the frame 18 close to its plane and they respectively support elongated carriage rails 58, 58 for sliding movement therealong. There are three (in the example shown) channel members 60, 60 adjustably mounted on the carriage rails 58, 58 to extend thereacross parallel to each other and aligned with the ends of the guide channels 32, 32 and in the same spaced relationship as said ends of the guide channels. The channels 60, 60 are constructed and arranged to receive the mating edge of the partitioning members L, L as they are thrust in sequence from the magazine 38. Initially, the rack 52 is in a lower position as shown in FIG. 4 wherein the uppermost channel member 60 is in registry with the bottom partitioning member L in the stack in the magazine 38 so as that partitioning member is thrust out of the magazine, its mating edge will be inserted into the channel of the uppermost member 60. Then, the rack is elevated one step so that the intermediate channel member 60 will be brought into registry with the lowermost partitioning member in the stack. After the second partitioning member is fed, the rack 52 is elevated another step to receive the third partitioning member. At this time, the channel members 60, 60 will be longitudinally aligned with the channel members 32, 32 so that the partitioning members can be moved into the channel members 32, 32.

The rack 52 also includes elongated plates 62, 62 (FIG. 5) which are parallel to the guide and support rods 56, 56, but which are disposed adjacent the plane of the frame 16. These elongated plates are supported in the position described on screws 64, 64 which are rotatable in the sliding rails 58, 58 and which extend horizontally forwardly therefrom. The said screws 64, 64 are threaded in the plates 62, 62 so that when the screws are rotated in one direction and another, the spacing between the said plates and the said slidable rails is adjusted to respectively increase or to decrease and thereby to accommodate partitioning members of different widths. One of the said screws 64 extends rearwardly from the open frame 18 and is provided with a sprocket 66 (FIGS. 3 and 6) to receive an endless chain 68 looped around a drive sprocket 70 on the jack screw 22 having the wrench head 24. Thus, as the said one jack screw is rotated to adjust the spacing between the frames 16 and 18, the said one screw 64 is also rotated. This one screw 64 and the remaining similar screws 64, 64 are provided with sprockets 72, 72 which receive an endless chain 74 so that all of the screws 64, 64 will be rotated the same amount in the same direction and at the same time. Thus, when the spacing between the frame 16 and 18 is adjusted, the spacing between the plates 62, 62 and the slidable rails 58, 58 is similarly adjusted for different width partitioning members.

As best shown in FIG. 5, a plurality of cross pieces 76, 76 are adjustably secured at their ends to the elongated plates 62, 62. The cross pieces 76, 76 are arranged in pairs so as to define a slot 78 between each pair, and there are three such pairs provided in the example shown. A pair of cross pieces 76, 76 is arranged as a companion for each channel member 60 and in the same inclined plane therewith. Thus, as a partitioning member L is moved out of the magazine 38, it will be thrust through a slot 78 into the channel of the companion channel member 60 and the pair of cross pieces 76, 76 defining the said slot will support the longitudinal edge of the partitioning member opposite the mating edge. Obviously, as the slide rails 58, 58 and their channel members 60, 60 are moved upwardly step-by-step, the elongated plates 62, 62 and their cross pieces 76, 76 move upwardly also. This step-by-step movement is accomplished by the elevator 54 which will now be described.

As shown in FIG. 4, the elevator includes a slide 80 which is movable on guide rods 82, 82, which, like the guide rods 56, 56 are supported on the frame 18. The rods 82, 82 are parallel to, but spaced inside the guide rods 56, 56. The slide 80 is reciprocated on the guide rods 82, 82 by the motor 44. That is, a shaft 84 driven by the said motor turns a crank 86 which is connected by a pivoted rod 88 to the bottom of the slide 80. Thus, as the shaft 84 is rotated, the slide 80 is reciprocated.

The slide 80 carries a pair of elevating pawls 90, 90 which engage beneath the channel members 60, 60 in succession as the slide is reciprocated to elevate the rack 52 step-by-step. After each step of elevation, a pair of similar pawls 92, 92 engage beneath the successive channel members 60, 60 to prevent the rack 52 from sliding down as the slide 80 is retracted. As shown in FIG. 6, the pawls 92, 92 are supported on brackets 94, 94 secured to the frame 18, but they operate similarly to the pawls 90, 90 as will now be described with particular reference to FIGS. 7 and 8.

The pawls 90, 90 are pivotally mounted on a fixed shaft 96 supported on the slide 80 and each such pawl has a torsion spring 98 associated therewith which tends to pivot the upper end of the associated pawl 90 forwardly. This forward movement is limited by an adjustable stop pin 100 engaging a portion of the slide 80, and in this stop position the associated pawl is located to engage the underside of a channel member 60.

When the rack 52 is in its lowermost position shown in FIG. 4, the pawls 90, 90 will be located to engage the underside of the middle channel member 60. Then, as the slide is elevated, the rack 52 will be elevated, and the middle channel member 60 will slide past the holding pawls 92, 92 pivoting them out of the way by engaging a cam surface like the cam surface 102 on the pawl 90 shown in FIG. 8. After the middle channel member clears the holding pawls 92, 92, the slide 80 will be returned toward the lower position and the said channel member will rest on the tops of the holding pawls 92, 92. As the slide moves downwardly, the cam surfaces 102, 102 on the pawls 90, 90 engage the lowermost channel member 60 and are moved out of the way until they clear the said lowermost channel member at the lower end of the elevator stroke. Then, as the elevator is again moved upwardly, the pawls 90, 90 will engage the bottom of the lowermost channel member 60 and move the rack 52 up another step to a position wherein the holding pawls 92, 92 will engage beneath the lowermost channel. In this position, the rack channel members 60, 60 are aligned with the previously described guide means on the frames 16 and 18.

After the partitioning members L, L have been pushed out of the rack and into the guide channels 30, 30 and 32, 32 by a pusher to be described, the rack is lowered to the position shown in FIG. 4. In order to do this, the elevating pawls 90, 90 and the holding pawls 92, 92 must be pivoted out of position so as not to engage the channels 60, 60. This is done by rotating a shaft 104 having a longitudinally spaced series of dogs such as the dog 105 (FIG. 8) thereon. Each dog is arranged to engage a pin 107 extending laterally from a pawl 90 or from a pawl 92, and when the shaft 104 is rotated in the proper direction, the pawls will be pivoted to the inactive position. In this connection, it is to be noted that each holding pawl has a torsion spring 98 the same as each elevating pawl 90, these springs tending to return the holding pawls to their holding position.

The shaft 104 is rotated in the proper direction by a fluid motor 106 (FIG. 9) which turns the shaft 104 by means of a crank 108. The control and operation of the fluid motor 106 will be described hereinafter in connection with a description of the whole machine operation.

The means lowering the rack 52 comprises a fluid motor, preferably an air cylinder, 110 (FIG. 4). This fluid motor has a piston rod 112 connected to one of the slide rails 58, and the fluid motor cylinder is supported on the frame 18. Preferably, the air cylinder fluid motor 110 is reversible so that it can be used to assist the motor-driven elevator 54 in raising the rack 52 in step-by-step movement as will be hereinafter described.

After the rack 52 has been fully elevated thereby to position the partitioning members L, L for entry into the guide channels 30, 30 and 32, 32 on the frames 16 and 18, they are thrust from the rack into the said guide channels by a pusher arm 114 which is shown in FIGS. 5 and 6. The said pusher arm is supported on a carriage 116 which slides along a guide rod 118 supported by the frame 16 parallel to the guide channels 30, 30 and 32, 32. The carriage is moved along the guide rod by means of a fluid motor which preferably comprises an air cylinder 120 and piston rod 122 which is connected to the carriage 116. As shown in FIG. 5, when the piston rod 122 is retracted, the pusher rod will move in an inclined plane downwardly to push the partition members out of the rack 52 and into the guide channels. The control and operation of the air cylinder 120 will be more fully described hereinafter.

As was mentioned before, the one set of longitudinal partitioning members L, L is moved down the channel members in a step-by-step manner to bring their slashed notches N, N in sequential registry with the slashed notches N, N of transverse partitioning members T, T which are fed one at a time from a second magazine. These transverse partitioning members are to be moved from the said second magazine mating edge first so that their notches can be moved into bisecting engagement with the notches on the three longitudinal partitioning members being fed.

Figure 3:
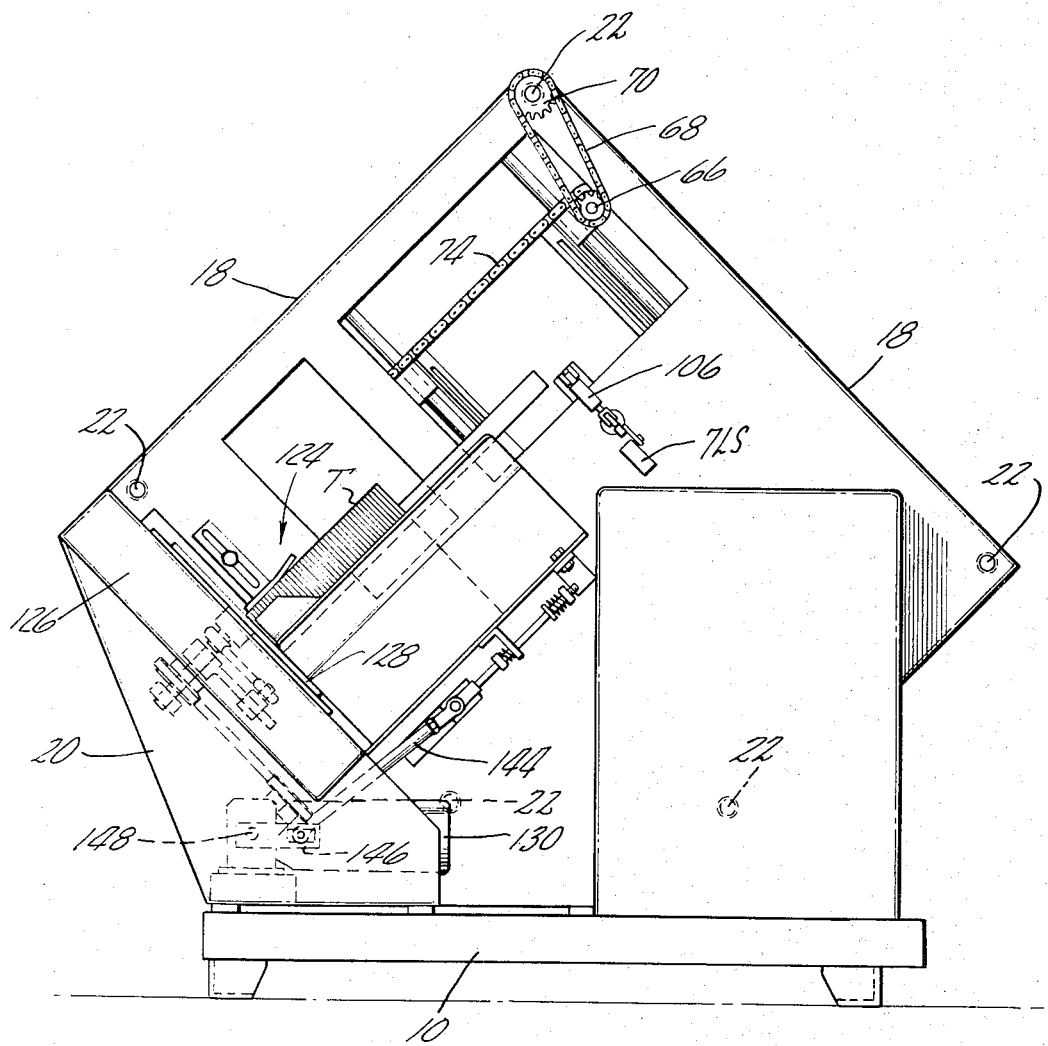
FIG. 3 is a view taken from the other side or rear of the machine.

The second magazine is best seen in FIG. 3 wherein it is identified generally by the reference number 124. The magazine 124 has a base 126 forming a part of the pedestal 20, and it will be observed that this base 126 is inclined and resides in a plane which is transverse to the guide channels 30, 30 and 32, 32. The transverse partitioning members T, T are supported on this base in a stack, and a slide plate 128 is reciprocated across the base 126 to move the lowermost partitioning member T from the stack outwardly from the magazine or forwardly therefrom to engage the lowermost partitioning member in the notches N, N of the longitudinal partitioning members with which it registers. This slide plate 128 is similar to the slide plate 42 of the magazine 38, and it is reciprocated through five cycles to move five transverse partitioning members T to complete the other set which is to be assembled with the three partitioning members L, L of the one set in the example being described.

The means reciprocating the feeder plate 128 comprises a second electric motor 130 (FIGS. 1 and 3) which has a driving connection with the feeder plate 128. As shown in FIG. 1, said driving connection includes a chain and sprocket unit 132, a driven shaft 134, and crank mechanism 136. As shown in FIG. 10, the stroke of the feeder plate 128 is sufficient to thrust a transverse partitioning member T into complete engagement with the three longitudinal partitioning members L, L comprising the first set.

The same motor 130 is used to operate the hitch feed mechanism for the longitudinal set as is used to feed the transverse set of partitioning members from the magazine 124, this to achieve timed operation. The said hitch feed includes a T-slotted member 138 (FIGS. 1, 4 and 10) which slides parallel to the channel members 32, 32 on a slide bar 140 secured to the frame 18. The slide bar 140 is parallel to the channel members 32, 32 and the base portion 142 of the T-slotted member 138 which rides on the said slide bar (FIG. 4) is pivotally connected by a motion transmitting link 144 (FIG. 3) to a crank 146 mounted on a shaft 148 driven by the motor 130. Thus, as the said motor operates to feed a transverse partitioning member T from the magazine 124, it also reciprocates the T-slotted member 138 through a cycle.

As best shown in FIG. 10, there are three forwardly projecting rods 150, 150 mounted in the T-slotted member 138 in adjusted positions, each such rod being associated with a partitioning member L in the longitudinal set. A roller 152 is rotatably supported on each rod 150 to engage the top surface of the longitudinal partition L in the guide channels 30 and 32 with which it is associated, the said roller tending to hold the partitioning member down in the same channels. Each such rod also pivotally supports a hitch feed pawl 154 having a head 156 which is biased downwardly by a spring 158. A pin 160 projecting from the pawl 154 is movable in the notch of a block 162 rigidly secured to the rod 150. This limited movement limits the pivotal movement of the pawl 154.

It will be observed that the pawl head 156 has a cam surface 164 thereon which tends to lift the pawl head whenever it strikes anything during movement of the T-slotted member 138 upwardly along the inclined path of the guide channels 30 and 32. However, the head being biased downwardly, the pawl 154 will tend to push anything engaged by the head during downward movement of T-slotted member. Therefore, as the said T-slotted member is reciprocated, the several pawls 154, 154 will be lifted out of the notches N, N of the partitioning members in the longitudinal set during upward movement of the T-slotted member. On the downward stroke of reciprocation, the heads 156, 156 of the said pawls will engage in the notches N, N to thrust the longitudinal set of partitioning members L, L downwardly. The stroke of the T-slotted member 138 is adjusted at the crank 146 to align the notches during each reciprocation with the transverse partitioning member T being fed from the magazine 124.

In describing the overall operation of the machine, reference will be made primarily to the wiring diagram, FIG. 11. However, it is to be understood that there are conventional electrical elements included in wiring diagram by symbol which are not shown otherwise in the various views of the drawings. Also, some of the electrical devices, such as limit switches are shown in the other views.

The first thing an operator should do before starting actual machine operation is to make sure that there is an adequate supply of longitudinal partitioning members L, L in the magazine 38 and of the transverse partitioning members T, T in the magazine 124. If there is an adequate supply, the weight of the stacks of partitioning members will close limit switches 3LS and 4LS connected in a circuit 201 which includes a cycle start control relay 7CR and which extends between the lead lines L1 and L2 of a 110 volt 60 cycle supply. If there is an inadequate supply of partitioning members in either of the magazines, one of the said limit switches will automatically open and prevent energization of the relay 7CR and thus prevent starting of a cycle of operation.

Assuming that there is an adequate supply of partitioning members in each magazine, the next step taken by the operator is to depress the push buton 3PB which completes a circuit 202 to energize three parallel reset control relays 3CR, 4CR and 5CR. When the relay 3CR is energized, it closes contacts 3CR1 to complete a subcircuit 204 around the reset push button 3PB to maintain the energized condition of the relays 3CR, 4CR and 5CR. The relay 3CR also closes contacts 3CR2 in a circuit 206 which includes normally closed overload contacts 10L and 20L, and this circuit 206 energizes a motor relay 1M and solenoid 1SOL and a control relay 6CR. The motor relay 1M closes contacts (not shown) to energize the motors 44 and 130 for continuous automatic cycling operation. The solenoid 1SOL controls a valve (not shown) to introduce air under pressure to the various fluid motor lines of the machine, and the relay 6CR closes contacts 6CR1 in parallel with the now closed contacts 3CR2.

Also, when the reset relay 3CR is energized, it opens contacts 3CR3, 3CR4, 3CR5, 3CR6 and closes normally open contacts 3CR7 and 3CR8. The reset relay 4CR at the same time opens normally closed contacts 4CR1, 4CR2, 4CR3, 4CR4 and closes normally open contacts 4CR5, 4CR6, and 4CR7. Also, at the same time, the energized control relay 5CR opens normally closed contacts 5CR1, 5CR2, 5CR3 and 5CR4 while closing normally open contacts 5CR5 and 5CR6.

As will be more fully understood in the following description, the opening of the normally closed contacts and the closing of the normally open contacts by the reset control relays 3CR, 4CR and 5CR sequentially resets the mechanical parts of the machine in starting or "home" positions while disabling the automatic control circuits until resetting is completed. Thus, automatic cycling of the machine cannot be started until the rack and elevator 52 and 54 have been lowered, until the pusher 114 has been raised to its start position, until the magazine feeder plates 42 and 128 have been retracted to a starting position, and until the hitch feed mechanism has been positioned to start.

In the resetting of the machine, when the pusher 114 reaches its upper or "home" position, it will engage and close a limit switch LS1 in a circuit 208 to energize a control relay 1CR. This relay then closes contacts 1CR1 in a circuit or line 210 including the solenoid 3SOL which will be energized when the said circuit 210 is completed to raise the elevator 54 with the assist of the air cylinder 110. The relay 1CR also closes contacts 1CR2 in a circuit 212 which will be described later.

The resetting of the machine and thus the lowering of the elevator 54 closes a limit switch 2LS in a circuit 214 to a control relay 2CR. This relay then opens its contacts 2CR1 to open the circuit 202 through the sub-circuit 204 thereby to de-energize the reset relays 3CR, 4CR and 5CR. At the same time, the relay 2CR also closes its contacts 2CR2 in the circuit 210 to further condition that circuit so that its solenoid 3SOL can ultimately be energized to raise the elevator 54. The relay 2CR also opens normally closed contacts 2CR3 in a line 216 which includes a solenoid 6SOL that operates a valve for the pawl control cylinder 106. Thus, the pawl control cylinder cannot be operated to move the elevator and holding pawls 90 and 92 out of operative position.

The next step in starting automatic cycling operation of the machine is taken by the operator in closing the cycle start push button 5PB. When this push button is closed, it energizes the relay 7CR in the line 201, and this relay closes its contacts 7CR1 connected in parallel with the push button 5PB so that the relay 7CR will remain energized for repeated cyclic operation of the machine. The relay 7CR also opens its contacts 7CR2 to disable the reset push button 3PB while the machine cycles automatically, thus making certain that the reset relays 3CR, 4CR and 5CR are de-energized.

It is at the time that the control relay or cycle start relay 7CR is energized that the feed plate 42 is to be moved rearwardly to thrust or feed the lowermost longitudinal partitioning member out of the magazine 38. This is accomplished by the relay 7CR closing its contacts 7CR3 in the line 210 and thereby energizing the control relay 8CR. This control relay when energized acts to energize a clutch associated with the motor 44 to operate the feed plate drive linkage. At the same time, the line 210 is completed to the solenoid 3SOL which conditions a valve controlling the air cylinder 110 so that said air cylinder will apply a bias outwardly on the piston 112 so that it can assist raising the elevator 54 when the motor-operated linkages start to raise said elevator. Thus, upon closing the cycle start push button 5PB, the first mechanical operation, that of feeding a longitudinal partition member L out of the magazine 38, starts to take place.

Also, when the cycle start push button is closed, and the relay 8CR is energized, it closes its contacts 8CR1 to complete the energization of the elevator raising solenoid 3SOL through two alternate circuits or lines 218 and 220. The line 220 includes one pole 6LS1 of a limit switch which is normally closed, but which has been held open by a cam 222 (FIG. 5) on the motor driven shaft 84 which shaft is so positioned by reason of the feed plate 42 having been ready to commence feed. However, the longitudinal partition feeding has started and the pole 6LS1 of the limit switch 6LS will be closed to complete the alternate circuit 220. At the same time, the second pole 6LS2 of the limit switch 6LS will open in a line 224 to a solenoid 4SOL which when energized will operate the air cylinder 120 to actuate the pusher 114.

The motion transmitting drive linkages from the motor 44 to the feed plate 42 and to the elevator slide 80 are such that when the longitudinal partitioning member has been fed into the rack 52, the elevator slide 80 will start upwardly, and the feed plate 42 will start to return. As the elevator starts upwardly, the limit switch 2LS is released and opened to de-energize the control relay 2CR. The opening of limit switch 2LS and the de-energization of control relay 2CR will have no affect on the operation of the machine at this time, and the feed plate 42 will continue to reciprocate and the elevator will continue to go up and down. That is, the limit switch 2LS will not again be closed until the rack 52 has been fully elevated in step-by-step movement and then lowered.

As the feed plate 42 returns to the initial position after feeding the first partitioning member and after feeding the second partitioning member, it will momentarily actuate the limit switch 6LS to open its pole 6LS1 and to close its pole 6LS2, but this too will not affect the machine operation. It is only when the third or last longitudinal partitioning member is fed into the rack 52 that a new step in machine operation takes place. At this time, the rack 52 will have been elevated as far as it is to go, and at limit switch 5LS (FIGS. 6 and 11) which it carries is positioned to be engaged and actuated by the mechanism feeding the third or last longitudinal partitioning member into the rack.

When the limit switch 5LS is closed, it completes the circuit 212 to energize relay 13CR. This relay closes its contacts 13CR1 in parallel around the limit switch 5LS to maintain the energized condition of the relay 13CR until the contacts 1CR2 in line 212 are opened as a result of relay 1CR being de-energized. Relay 1CR is de-energized only when the pusher 114 starts to move thereby opening limit switch 1LS.

Also, when the relay 13CR is energized, it will open its contacts 13CR2 in alternate circuit 218 which will put the relay 8CR and solenoid 3SOL under control of limit switch pole 6SL1. When this limit switch is then actuated, it will stop the crank feeding the longitudinal members L, L in its home position and it will shut off elevator assist air to the rack 52. In addition, the relay contacts 13CR3 will be closed in the line 224 to energize the solenoid 4SOL which will operate the valve controlling air cylinder 120 to start the pusher down its inclined path to move the longitudinal partitioning members into the frame guide means. The solenoid 4SOL will actually be energized shortly after the contacts 13CR3 are closed. That is, the line 224 will be completed only when the limit switch pole 6LS2 is closed as a result of the feed plate returning to its initial position. It should be noted that the limit switch pole 9LS1 in line 224 will be closed by the fact that the transverse feed plate 128 is in a position ready to feed.

Thus, with the feeding of the third or last longitudinal partitioning member to energize the control relay 13CR, and the subsequent return of the feed plate 42 to its initial position, the pusher will start to move the three longitudinal partitioning members out of the rack 52 and into the feed channels 30, 30 and 32, 32.

At this time, reciprocation of the feed plate 42 stops so that additional partitioning members will not be fed from the magazine 38. This is accomplished by the relay 8CR being de-energized with the opening of contacts 13CR2 in alternate circuit 218. When the relay 8CR is de-energized, the clutch and brake mechanism associated with the motor 44 is operated to prevent the feed plate 42 from being reciprocated. Obviously, as the feed plate is restored to its initial position, the limit switch 5LS will open, but the relay 13CR will remain energized because its contacts 13CR1 are closed. As the pusher 114 moves downwardly, leaving its initial position, the limit switch 1LS opens to de-energize the relay 1CR as was previously mentioned. This causes the contacts 1CR2 in line 212 to open thereby de-energizing the relay 13CR. This causes solenoid 4SOL to be de-energized, but the pusher cylinder 120 continues to move the pusher downwardly, the valve operated by the solenoid 4SOL being a non-biased valve.

As the air cylinder 120 retracts its piston 122 to move the pusher 114 downwardly, a double pole limit switch 8LS (FIGS. 2 and 11) is actuated to open its pole 8LS1 in line 224 and to close its pole 8LS2 in an alternate line 226 feeding circuit 228. With the closing of the pole 8LS2, the circuit connections 226 and 228 are conditioned to energize the relay 9CR which will not be energized until the longitudinal set of partitioning members have been fully positioned in the channels 30, 30 and 32, 32 being engaged by the hitch feed mechanism.

When the first set of longitudinal partitioning members have been fully thrust into the channels, a limit switch 11LS (FIGS. 2 and 11) is actuated. That is, the limit switch 11LS is closed to energize the relay 11CR. When the relay 11CR is energized, its contacts 11CR1 are closed to complete the circuit connections through lines 226 and 228 to relay 9CR. Relay 9CR closes its contacts 9CR1 to maintain the energized condition of the relay 9CR as long as the limit switch pole 8LS2 in line 226 remains closed. The relay 9CR controls the clutch and brake structure associated with the transverse feed motor 130 so that the said motor can be used to feed the transverse partitions by reciprocating the feed plate 128.

The energization of the relay 11CR also causes it to close its contacts 11CR2 to energize a relay 12CR. It will be noted that the relay 12CR has contacts 12CR1 which are closed with energization of the relay to maintain its energized condition. It also closes contacts 12CR2 in the line 216 to energize the solenoid 6SOL. The solenoid 6SOL operates the valve which provides air under pressure to the air cylinder 106 which rotates the shaft 104 to move the lifting pawls 90, 90 and the holding pawls 92, 92 out of operative position so that the rack and elevator 52, 54 can be lowered.

At this same time, the air cylinder 120 will be reversed to start the pusher 114 upwardly to restore it to its initial position. This is done by the control relay 11CR closing additional contacts 11CR3 in a line 230 to energize the solenoid 5SOL. This solenoid positions the valve controlling the air cylinder 120 to cause its piston rod 122 to be extended.

While the pusher 114 is being moved upwardly to restore its initial position, the rack 52 and elevator 54 are lowered. The said rack and elevator are started downwardly when the air cylinder 106 has thrust its piston rod downwardly a sufficient distance to actuate the limit switch 7LS (FIGS. 9 and 11). The limit switch 7LS is a double pole switch having a pole 7LS1 which is closed in a line 232 to energize a solenoid 2SOL. This solenoid acts upon the valve controlling air cylinder 110 to retract its piston rod 112 thereby lowering the rack 52. The second pole of the limit switch, 7LS2, is opened in line 210 for assurance that the elevator or rack raising solenoid 3SOL cannot be energized.

When the rack 52 is fully restored to its lowered position, the limit switch 2LS will be engaged and closed to again energize relay 2CR. Upon energizing relay 2CR, its contacts 2CR3 will be opened in the line 216 to de-energize the solenoid 6SOL. When the solenoid 6SOL is de-energized, the lifting pawls 90, 90 and the holding pawls 92, 92 will be restored to operative positions by their springs 98, 98.

When the pusher bar has been fully restored to its upper or "ready" position, the limit switch 1LS will be engaged and closed to again energize the relay 1CR. Thus, the circuitry controlling the operation of the feeding of the longitudinal partitioning members from the magazine 38 and for controlling the operation of the elevator 54 will be restored to the condition at which the cycle start push button 5PB was depressed. However, it is unnecessary to again depress the cycle start button because the cycle will repeat itself automatically. In this connection, it is to be noted that the limit switch 7LS will be restored to its initial position. That is, when the solenoid 6SOL is de-energized upon energization of the relay 2CR, the valve controlled by that solenoid will be spring-returned to its initial position so as to return the pawl actuating air cylinder 106 to its inactive position.

During the time that the pusher 114 is being restored to its initial position, and while the rack 52 is being lowered, the motor 130 will be operating the reciprocating feed mechanism for the magazine 124 and the hitch feed mechanism for moving the longitudinal partition members downwardly in timed relationship with the said magazine feed. As the feed plate 128 leaves its initial position to feed the first transverse partitioning member, it acts upon the limit switch 9LS to open the first pole 9LS1 thereof and to close the second pole 9LS2. The second pole 9LS2 maintains the energized condition of the relay 9CR, and the open pole 9LS1 assures that the line 224 cannot be completed to energize the solenoid 4SOL to again move the pusher 114 downwardly until the feeding of the transverse partitioning members has been completed.

As was the case with the feed mechanism for the longitudinal magazine 38, the hitch feed and feeder plate for the transverse magazine 124 will continue to operate until five transverse partitioning members T, T have been fed and engaged as a set with the set of longitudinal partitioning members L, L. When this has been done, the movement of the longitudinal partitioning members downwardly will have escaped the limit switch 8LS which will be restored to its initial position. When the limit switch 8LS is restored to its initial position, followed by actuation of 9LS, the relay 9CR will be de-energized at a time when the transverse feeder plate 120 is restored to its initial position. When the relay 9CR is de-energized, the clutch and brake mechanism associated with the motor 130 is operated to prevent further feeding of transverse partitioning members and further operation of the hitch feed mechanism.

At the same time, the closed pole 8LS1 of the limit switch 8LS will condition the solenoid 4SOL to be energized whenever the last longitudinal partitioning member in the second longitudinal set has been fed to close the limit switch 5LS and thus to energize the relay 13CR.

It will be seen that after resetting and commencing automatic operation of the machine by means of the cycle start push button, the longitudinal set of partitioning members is made up and moved into position for engagement with the transverse set of partioning members at the magazine 124. While this transverse set is being engaged with the longitudinal set, a second longitudinal set is being made up and made ready to be moved into position at the magazine 124 for engagement with a second transverse set. Thus, while one longitudinal and one transverse set are being assembled or engaged, a next longitudinal set is being made ready so that the machine will operate without delays between the engagement of sets.

The assembled partitions move out of the machine over rollers 250, 250 (FIGS. 1, 2 and 4) at the lower end of the guide channels 30, 30 and 32, 32. The assembled partitions then drop to the base of the machine being guided during the drop by a guide rod 252 (FIG. 1).

These assembled partitions can be used immediately in cases or they can be collapsed and stored for later use.

The invention claimed is:

1. A machine for assembling case partitioning members in two parallel sets which cross each other and which are joined by engaging regularly spaced notches along their mating edges, comprising guide means for accommodating longitudinal movement of the members of one set while they are disposed in spaced generally parallel relationship with their mating edges facing the same side of the guide means, a first magazine for the members of one set adjacent one end of the guide means having associated means for feeding and positioning the members of the said one set in said one end of the guide means, a second magazine adjacent the other end of the guide means for the members of the other set and having a feeder for advancing the members thereof one at a time and mating edge first toward and transversely of said guide means, and means for advancing said one set along said guide means in steps and in timed relationship with the operation of the second magazine feeder so that the notches in the members of the one set are positioned sequentially for engagement with the notches in the sequentially fed members of said other set.

2. A machine for assembling case partitioning members in two parallel sets which cross each other and which are joined at regularly spaced notches along their mating edges, comprising a first magazine for a stack of members for one set and having a feeder for advancing the members one at a time edgeways from the stack, driven means for locating the fed members for the said one set in spaced parallel relationship, drive means operating said feeder and locating means in timed relationship, guide means for accommodating longitudinal movement of the one set with the members thereof in spaced generally parallel relationship, a second magazine for a stack of members for the other set and having a feeder for advancing the members thereof one at a time edgeways and transversely of the said one set and means for advancing said one set along said guide means in steps and in timed relationship to the operation of the second magazine feeder so that the notches in the members of the one set are positioned sequentially to engage the notches in the sequentially fed members of said other set.

3. A machine for assembling case partitioning members in two parallel sets which cross each other and which are joined at regularly spaced slashed notches along their mating edges, comprising a first magazine for a stack of members for one set and having a feeder for advancing the members one at a time edgeways from the stack, driven means for locating the fed members for the said one set in spaced parallel relationship, drive means operating said feeder and said locating means in timed relationship, guide means for supporting the members of said one set in said spaced generally parallel relationship and for accommodating longitudinal movement of them, a second magazine for a stack of members for the other set and having a feeder for advancing the members thereof one at a time edgeways from the stack, and transversely of the said one set, a hitch feed for advancing said one set along said guide means in steps so as to position the similar slashes in the members thereof in sequence to receive the sequentially fed members from the second magazine, and drive means for operating the second magazine feeder and said hitch feed in timed relationship.

4. A machine for assembling two sets of parallel case partitioning members having mating edges provided with regularly spaced notches so that one set can be connected transversely to the other by relative movement of their mating edges toward each other with the notches in one set in bisecting alignment with the notches of the other set, the said machine comprising elongated guide means adapted to accommodate generally parallel and simultaneous longitudinal movement of the members of one set from one end toward the other end of said guide means, a first magazine and associated feed mechanism for inserting a first set of said members in said guide means at said one end thereof in spaced apart generally parallel relationship with their notches substantially aligned and with their mating edges facing one side of said guide means, a second magazine and associated feed mechanism adjacent the other end of said guide means for advancing partitioning members one at a time and mating edge first from said one side of the guide means and transversely to the said first set of members to connect the members one at a time to the members of the first set, a hitch feed for advancing the members of said first set simultaneously and in step-by-step fashion along said guide means to bring their successive aligned notches into registry with the members being fed successively from said second magazine, and drive means for operating the said hitch feed and the feed mechanism associated with said second magazine in timed relationship.

5. A machine for assembling two sets of parallel case partitioning members which have mating edges provided with regularly spaced slashed notches so that the members of one set can be connected transversely to the members of the other set by relative movement of their mating edges toward each other with the notches in one set in bisecting alignment with the notches of the other set, the said machine comprising a plurality of spaced apart generally parallel guide channels which are inclined to accommodate generally parallel and simultaneous longitudinal movement of the partitioning members of one set downwardly therein, a movable rack adjacent the upper end of said guide channels for supporting a plurality of members for entry into said guide channels, a first magazine for a stack of members adjacent said rack and having a first feeder for advancing the members one at a time and mating edge first from one side of the guide channels and parallel thereto onto said rack, an elevator for moving said rack step-by-step to receive the successive members from said magazine to accumulate the one set thereof and to position them for longitudinal entry into said guide channels, a common drive for said elevator and said first feeder, a pusher for moving said one set from said rack downwardly into said guide channels, a second magazine for a stack of members for the other set adjacent the lower end of said guide channels and having a second feeder for advancing the members one at a time and mating edge first from the other side of the guide channels and transversely thereto to assemble the members one at a time with the one set of members in the guide channels, a hitch feed including a plurality of pawls engageable successively in successive notches in the respective members of the one set to move the one set downwardly in said guide channels step-by-step to expose the successive notches therein for engagement with the notches of the successive members being fed from said second magazine, a common drive for said second feeder and said hitch feed, and means for actuating said pusher in timed relationship with the operation of both of said common drives.

6. A machine for assembling case partitioning members in two parallel sets which cross each other and which are joined by engaging regularly spaced notches along their mating edges, comprising a first and a second support frame which are arranged in spaced parallel relationship and which cooperate to provide guide means for accommodating longitudinal movement of the members of one set while they are disposed in spaced generally parallel relationship with their mating edges facing the second support frame, a first magaine for the members of one set carried by said first support frame adjacent one end of said guide means and having associated means for feeding and positioning the members of the said one set in said one end of the guide means, a second magazine for the members of the other set associated with said second support frame adjacent the other end of said guide means and having a feeder for advancing the members thereof one at a time and mating edge first toward and transversely of said guide means, and means for advancing said one set along said guide means in steps and in timed relationship with the operation of the second magazine feeder so that the notches in the members of the one set are positioned sequentially for engagement with the notches in the sequentially fed members of said other set.

7. A partition assembling machine as set forth in claim 6 wherein means is provided for adjusting the relative positions of the first and second support frames whereby the width of the guide means can be adjusted to accommodate partition members of different widths.

8. A machine for assembling case partitioning members in two parallel sets which cross each other and which are joined by engaging regularly spaced notches along their mating edges, comprising a first and a second support frame which are disposed in spaced parallel vertical planes and which cooperate to provide guide means for accommodating longitudinal movement of the members of one set while they are disposed in spaced generally parallel relationship with their mating edges facing the second support frame, a first magazine for the members of one set carried by said first support frame adjacent one end of said guide means and having a feeder for moving the members one at a time edgeways from the magazine, driven means for locating the fed members at said one end of the guide means, drive means operating said feeder and locating means in timed relationship, a second magazine for the members of the other set associated with the second support frame adjacent the other end of said guide means and having a feeder for moving the members thereof one at a time and mating edge first toward and transversely of said guide means, and means for advancing said one set along said guide means in steps and in timed relationship to the operation of the second magazine feeder so that the notches in the members of said one set are positioned sequentially to engage the notches in the sequentially fed members of said other set.

9. A partition assembling machine as set forth in claim 8 wherein means is provided for adjusting the position of the first support frame relative to the second whereby the width of the guide means can be adjusted to accommodate partition members of different widths.

10. A machine for assembling case partitioning members in two parallel sets which cross each other and which are joined by engaging regularly spaced notches along their mating edges, comprising a first and a second support frame which are disposed in spaced parallel vertical planes and which cooperate to provide guide means for accommodating longitudinal movement of the members of one set while they are disposed in spaced generally parallel relationship with their mating edges facing the second support frame, a first magazine for the members of one set carried by said first support frame adjacent one end of said guide means and having a feeder for moving the members one at a time edgeways from the magazine, driven means for locating the fed members at said one end of the guide means, drive means operating said feeder and locating means in timed relationship, a second magazine for the members of the other set associated with the second support frame adjacent the other end of said guide means and having a feeder for moving the members thereof one at a time and mating edge first toward and transversely of said guide means, a hitch feed for moving said one set along said guide means in steps so as to position the similar notches in the members thereof in sequence to receive the sequentially fed members from the second magazine, and drive means for operating the second magazine feeder and said hitch feed in timed relationship.

11. A partition assembling machine as set forth in claim 10 wherein means is provided for adjusting the position of the first support frame relative to the second whereby the width of the guide means can be adjusted to accommodate partition members of different widths.

12. A machine for assembling case partitioning members in two parallel sets which cross each other and which are joined by engaging regularly spaced notches along their mating edges, comprising a first and a second support frame which are disposed in spaced parallel vertical planes and both of which have a series of inclined channels which cooperate to provide guide means for supporting and accommodating longitudinal movement of one set of the members downwardly therein in spaced generally parallel relationship to each other with their mating edges facing the second support frame, a movable rack supported in part by each of said support frames adjacent the upper end of said channels for supporting the said one set of members for entry into said channels, a first magazine for the members of said one set carried by said first frame and having a feeder for moving the members one at a time into said rack, an elevator for moving said rack step-by-step to receive the members from the first feeder and position them for entry to the channels, a common drive for said first feeder and elevator, a pusher for moving said one set from said rack into the guide channels, a second magazine for the members of the other set associated with the second support frame adjacent the lower end of the guide channels and having a second feeder for moving the members thereof one at a time and mating edge first toward and transversely of said channels, a hitch feed including a plurality of pawls engageable successively in successive notches in the respective members of said one set to move the same downwardly in said guide channels step-by-step to expose the successive notches thereof for engagement in the notches of the successive members being fed from the second magazine, a common drive for said second feeder and hitch feed, and means for actuating said pusher in timed relationship with the operation of both of said common drives.

13. A partition assembling machine as set forth in claim 12 wherein means is provided for adjusting the position for said first support frame relative to the second to adjust the spacing between the series of channel members and thereby to accommodate partitioning members of different widths.

14. The machine set forth in claim 13 wherein the channel members of each series are adjustable relative to each other.

References Cited
UNITED STATES PATENTS

| | | | |
|---|---|---|---|
| 2,355,461 | 8/1944 | Nichols | 93—37 |
| 3,225,665 | 12/1965 | Lovett et al. | 93—37 |

BERNARD STICKNEY, *Primary Examiner.*